(No Model.)

E. S. PRATT.
MONKEY WRENCH.

No. 502,997. Patented Aug. 8, 1893.

Witnesses
W. J. McMillan
J. C. Cameron

Inventor
Edwin S. Pratt
by Donald C. Ridout & Co.
attys.

UNITED STATES PATENT OFFICE.

EDWIN S. PRATT, OF PARRY SOUND, CANADA.

MONKEY-WRENCH.

SPECIFICATION forming part of Letters Patent No. 502,997, dated August 8, 1893.

Application filed March 23, 1893. Serial No. 467,293. (No model.)

*To all whom it may concern:*

Be it known that I, EDWIN SYLVESTER PRATT, of the town of Parry Sound, in the district of Parry Sound and Province of Ontario, Canada, have invented a certain new and Improved Monkey-Wrench, of which the following is a specification.

The object of the invention is to provide a monkey wrench which can be adjusted quickly for the purpose of suiting various sizes of heads or be adjusted like any ordinary screw monkey wrench, and it consists in the peculiar construction, arrangement and combinations of parts hereinafter more particularly described and then definitely claimed.

Figure 1:
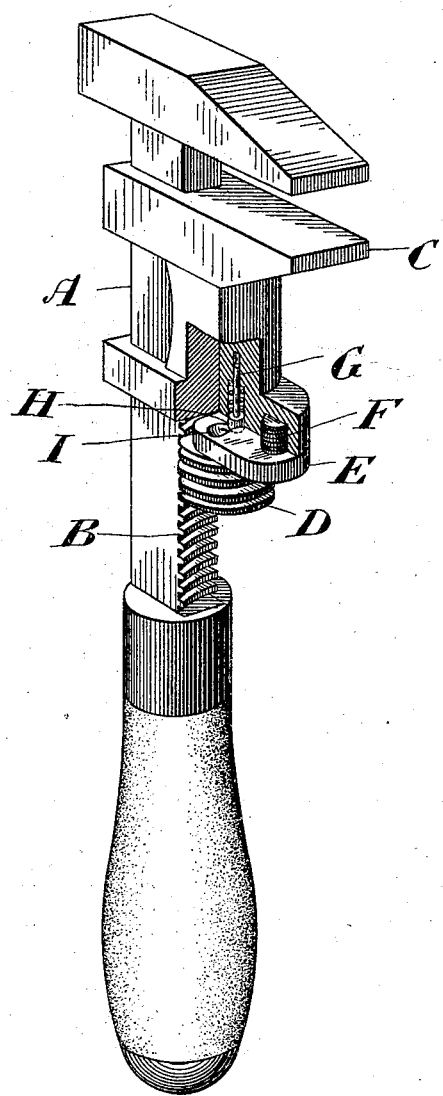
Figure 2:
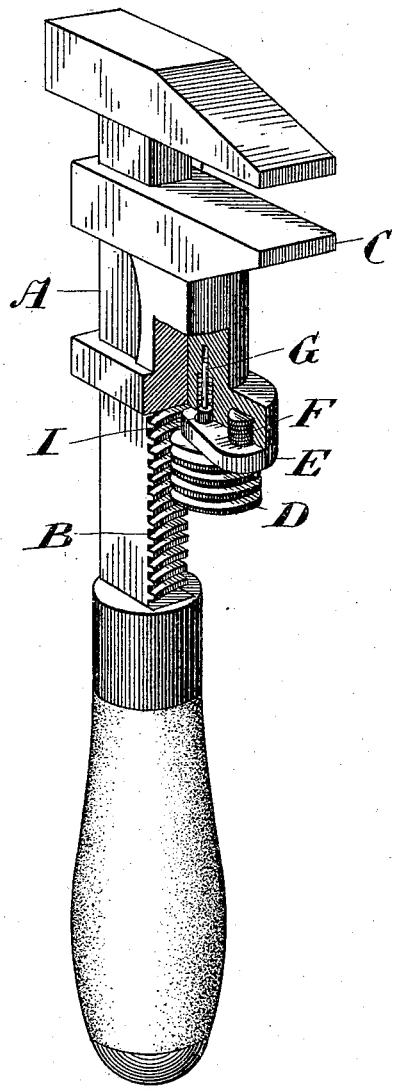

Figure 1, is a perspective view partially in section of my improved monkey wrench with its screw adjusted in position to work with the rack on the shank. Fig. 2, is a similar view with the screw thrown out of connection with the said rack.

A, is a shank made in the ordinary way and having a suitable rack B, formed on it.

C, is a loose head connected to the shank A, in the usual way.

D, is a screw designed to mesh with the rack B. The screw D, is pivoted on the plate E, so that it will revolve freely on its pivot. The plate E, is connected to the loose head C, by means of a pin F. The plate E, is carried in this manner so that it may be swung on the pin F, and thus carried clear of the rack B, as indicated in Fig. 2.

In the body of the loose head C, I provide a spring-bolt G, which latches into a cup H, formed in the plate E. When the plate E, is adjusted to cover the bottom of the loose head C, the spring-bolt G, latches into the cup H, thus holding the plate E, from revolving on its pin F. When thus held, the screw D, engages with the rack B, and thus the loose head C, may be adjusted like any ordinary monkey wrench.

When it is desired that the loose head C, should be moved quickly for the purpose of adapting the wrench to suit different sizes of heads or nuts, it is merely necessary to push upon the screw D, or plate E, so as to swing the said plate on its pin F, and carry the screw D, clear of the rack B. A cup I, is formed in the plate E, which receives the end of the spring bolt G, when the screw D, is thrown out of contact with the rack B, and thus holds the screw in that position.

Having moved the loose head to suit the size of head or nut desired, the plate E, is swung back so as to bring the screw D, into mesh with the rack B, when the nut may be used like any ordinary monkey wrench. The spring-bolt, is sufficiently strong to hold the screw D, either in or out of position for adjusting the loose head C, but it is not sufficiently strong to prevent the screw D, being thrown in or out of contact with the rack B, by the simple pressure of the thumb when it is desired to quickly adapt the wrench to suit a head or nut of a different size.

What I claim as my invention is—

The combination in a monkey wrench, of a shank, a loose head adjustable thereon, a rack on said shank, a plate E carrying the screw D and pivoted to the loose head so that the screw may be moved in and out of gear with the rack on the shank, a cup on said plate E, and a spring bolt G working in a recess in the movable head and adapted to enter said cup, substantially as described.

Parry Sound, February 27, 1893.

EDWIN S. PRATT.

In presence of—
H. ARMSTRONG,
M. E. McCURRY.